US010640620B2

(12) United States Patent
Ooaira et al.

(10) Patent No.: US 10,640,620 B2
(45) Date of Patent: May 5, 2020

(54) ACRYLIC RESIN COMPOSITION FOR FILM

(71) Applicant: Mitsubishi Rayon Co., Ltd., Tokyo (JP)

(72) Inventors: Kazuya Ooaira, Otake (JP); Junichi Abe, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 593 days.

(21) Appl. No.: 14/386,074

(22) PCT Filed: Mar. 22, 2013

(86) PCT No.: PCT/JP2013/058223
§ 371 (c)(1),
(2) Date: Sep. 18, 2014

(87) PCT Pub. No.: WO2013/141334
PCT Pub. Date: Sep. 26, 2013

(65) Prior Publication Data
US 2015/0044439 A1 Feb. 12, 2015

(30) Foreign Application Priority Data

Mar. 22, 2012 (JP) .................................. 2012-065233

(51) Int. Cl.
| | |
|---|---|
| *C08J 5/18* | (2006.01) |
| *B29C 48/08* | (2019.01) |
| *B29C 48/30* | (2019.01) |
| *B29C 48/305* | (2019.01) |
| *C08K 5/3492* | (2006.01) |
| *B32B 27/36* | (2006.01) |
| *B32B 25/08* | (2006.01) |
| *B32B 27/30* | (2006.01) |
| *B32B 27/18* | (2006.01) |
| *B32B 27/22* | (2006.01) |
| *C08L 23/10* | (2006.01) |
| *B32B 27/08* | (2006.01) |
| *B32B 27/28* | (2006.01) |
| *B32B 27/32* | (2006.01) |
| *B29K 33/00* | (2006.01) |
| *B29K 105/00* | (2006.01) |

(52) U.S. Cl.
CPC ................ *C08J 5/18* (2013.01); *B29C 48/08* (2019.02); *B29C 48/30* (2019.02); *B29C 48/305* (2019.02); *B32B 25/08* (2013.01); *B32B 27/08* (2013.01); *B32B 27/18* (2013.01); *B32B 27/22* (2013.01); *B32B 27/28* (2013.01); *B32B 27/302* (2013.01); *B32B 27/304* (2013.01); *B32B 27/308* (2013.01); *B32B 27/32* (2013.01); *B32B 27/365* (2013.01); *C08K 5/34926* (2013.01); *C08L 23/10* (2013.01); *B29K 2033/12* (2013.01); *B29K 2105/0044* (2013.01); *B29K 2995/0088* (2013.01); *B32B 2250/02* (2013.01); *B32B 2250/24* (2013.01); *B32B 2307/21* (2013.01); *B32B 2307/306* (2013.01); *B32B 2307/3065* (2013.01); *B32B 2307/4026* (2013.01); *B32B 2307/412* (2013.01); *B32B 2307/558* (2013.01); *B32B 2307/712* (2013.01); *B32B 2307/732* (2013.01); *C08J 2333/06* (2013.01); *C08J 2333/08* (2013.01); *C08J 2479/04* (2013.01); *C08L 2201/08* (2013.01); *Y10T 428/24967* (2015.01); *Y10T 428/269* (2015.01)

(58) Field of Classification Search
CPC ..... B29C 47/0021; B29C 47/14; B32B 25/08; B32B 27/08; B32B 27/18; B32B 27/22; B32B 27/28; B32B 27/302; B32B 27/304; B32B 27/308; B32B 27/32; B32B 27/365; C08J 5/18; C08K 5/34926; C08L 23/10; B29K 2033/12; B29K 2105/0044
See application file for complete search history.

(56) References Cited

U.S. PATENT DOCUMENTS

| | | | | |
|---|---|---|---|---|
| 4,804,717 | A * | 2/1989 | Ramey | ................ C08F 220/12 525/203 |
| 2002/0099218 | A1 * | 7/2002 | Sassi | .................... C07D 211/46 546/233 |
| 2002/0161075 | A1 * | 10/2002 | Sassi | .................... C07D 211/46 524/99 |

(Continued)

FOREIGN PATENT DOCUMENTS

| | | | |
|---|---|---|---|
| JP | 01271449 | A * | 10/1989 |
| JP | 01271449 | A * | 10/1989 |

(Continued)

OTHER PUBLICATIONS

JP H01-271449 A Machine Translation.*
JP 2010-222543 A Machine Translation.*
JP 2011-256346 A Machine Translation.*
CYASORB UV-3346 Data Sheet.*
CHEMIASSORB 944 Data Sheet.*
JP 2009173864 A Machine Translation.*
Chemassorb 944 Datasheet.*
CYASORB UV-3529 Datasheet.*

(Continued)

*Primary Examiner* — Travis M Figg
(74) *Attorney, Agent, or Firm* — Morgan, Lewis & Bockius LLP

(57) ABSTRACT

The purpose of the present invention is to provide an acrylic resin composition for a film having reduced bleeding and sticking to a roll during formation of an acrylic resin film. The present invention is an acrylic resin composition for a film, the composition comprising: a high-molecular-weight hindered amine-based light stabilizer (A) having a triazine backbone; and an acrylic resin (B). When this acrylic resin composition for a film is used, there is reduced bleeding to a roll surface during film formation, and minimized sticking of the film to the roll.

12 Claims, No Drawings

(56) References Cited

U.S. PATENT DOCUMENTS

| | | | | |
|---|---|---|---|---|
| 2004/0183053 | A1* | 9/2004 | Pearson | C07D 211/76 252/400.21 |
| 2006/0110617 | A1* | 5/2006 | Kitaike | B29C 45/14811 428/522 |
| 2006/0111481 | A1* | 5/2006 | Pearson | C08K 5/34 524/100 |
| 2008/0029933 | A1* | 2/2008 | Higashiizumi | C08K 5/3435 264/328.1 |
| 2008/0304393 | A1* | 12/2008 | Shibuya | C08K 5/3435 369/112.01 |
| 2010/0216930 | A1* | 8/2010 | Ihara | G02B 1/04 524/430 |
| 2012/0046408 | A1* | 2/2012 | Minkwitz | C08K 5/34 524/504 |
| 2014/0036334 | A1* | 2/2014 | Ohnishi | G02B 5/23 359/241 |

FOREIGN PATENT DOCUMENTS

| | | | |
|---|---|---|---|
| JP | H01-271449 A | | 10/1989 |
| JP | 2005113066 A | * | 4/2005 |
| JP | 2009-173864 A | | 8/2009 |
| JP | 2009173864 A | * | 8/2009 |
| JP | 2009173864 A | * | 8/2009 |
| JP | 4406304 A | | 1/2010 |
| JP | 2010-222543 A | | 10/2010 |
| JP | 2010222543 A | * | 10/2010 |
| JP | 2010222543 A | * | 10/2010 |
| JP | 2011-256346 A | | 12/2011 |
| JP | 2011256346 A | * | 12/2011 |
| JP | 2011256346 A | * | 12/2011 |
| WO | 2011/092989 A1 | | 8/2011 |

OTHER PUBLICATIONS

Kano et al. JP 2005/113066 A; machine translation (Year: 2005).*
Chimassorb 2020 Datasheet (Year: 2010).*
Chimassorb 2020 Data Sheet.*
International Search Report issued in corresponding International Patent Application No. PCT/JP2013/058223 dated Jun. 25, 2013.
Office Action issued in counterpart Korean Patent Application No. 2014-7029477 dated Oct. 5, 2015 (partial English translation of the part related to JPH01-271499).
Office Action issued in counterpart Japanese Patent Application No. 2013-514459 dated Jun. 22, 2017.

* cited by examiner

ACRYLIC RESIN COMPOSITION FOR FILM

TECHNICAL FIELD

The present invention relates to an acrylic resin composition for a film.

BACKGROUND ART

Acrylic resins are known as one of the materials excelling the most in weather resistance among plastic materials. Films with methylmethacrylate as a main component are being used for the purpose of laminating over various plastic materials to curb the deterioration in the weather resistance of these. Thereamong, acrylic resin films consisting of acrylic resin containing a rubbery material excel in transparency, weather resistance, flexibility, processability, etc. For this reason, acrylic resin films are pasted on the surfaces of resin molded articles, woodworking manufactured goods, and metal molded articles, and used as a skin material for building material applications such as vehicles, furniture, door materials, window frames, baseboards or bathroom interiors; masking films; or films for high luminance reflective material coatings.

In order to impart sufficient weather resistance to these acrylic resins, it is desired to have a benzotriazole-based ultraviolet absorber and hindered amine-based light stabilizer contained.

Patent Document 1 discloses the use of a low-molecular-weight hindered amine-based light stabilizer.

[Patent Document 1] Japanese Patent No. 4406304

DISCLOSURE OF THE INVENTION

Problems to be Solved by the Invention

However, low-molecular-weight hindered amine-based light stabilizers tend to have low thermal decomposition temperatures due to being lower molecules, and bleeding to the roll has been recognized during the film formation of films. In addition, depending on the case, sticking to the roll has also been recognized.

Therefore, an object of the present invention is to provide an acrylic resin composition for films having reduced bleeding to the roll upon film formation of an acrylic resin film.

Means for Solving the Problems

The present invention is the following first to fifteenth aspects of the invention.

According to a first aspect of the present invention, an acrylic resin composition for films includes: a high-molecular-weight hindered amine-based light stabilizer (A) having a triazine backbone; and an acrylic resin (B).

According to a second aspect of the present invention, in the acrylic resin composition for films as described in the first aspect, the high-molecular-weight amine-based light stabilizer (A) includes a structural unit represented by Formula (I) below.

[Chem. 1]

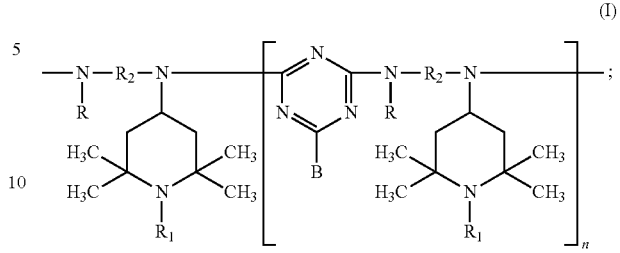

(In Formula (I), n represents 2, 3, 4 or 5.

Each $R_1$ independently represents a hydrogen atom; a C1 to C8 alkyl group; a C2 to C8 hydroxyalkyl group; a C1 to C8 cyanoalkyl group; a C3 to C6 alkenyl group or alkynyl group; a C7 to C9 phenylalkyl group that is unsubstituted or substituted by one, two or three C1 to C4 alkyl groups on the phenyl group; or a C1 to C8 acyl group.

Each $R_2$ independently represents a C2 to C12 alkylene group; a C4 to C12 alkenylene group; a C2 to C8 alkynylene group; a C5 to C7 cycloalkylene group; a C5 to C7 cycloalkylene di(C1 to C4 alkylene) group; a C1 to C4 alkylene di(C5 to C7 cycloalkylene) group; a phenylene di(C1 to C4 alkylene) group; a 1,4-piperazinediyl; a C4 to C12 alkylene group having a structure including —O— or —N($X_1$)— ($X_1$ represents a C1 to C12 acyl group, a (C1 to C12 alkoxy)carbonyl group, or any group represented by L below) between a C—C bond; following Formula (a); following Formula (b) or following Formula (c).

[Chem. 2]

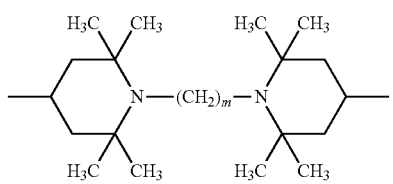

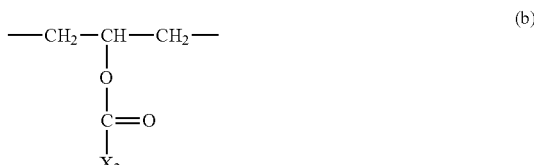

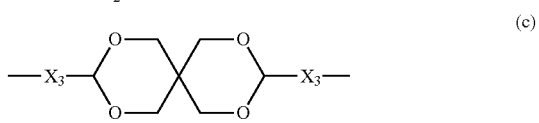

(In Formula (a), m represents 2 or 3. In Formula (b), $X_2$ represents a C1 to C18 alkyl group; a C5 to C12 cycloalkyl group that is unsubstituted or substituted by one, two or three C1 to C4 alkyl groups; a phenyl group that is unsubstituted or substituted by one, two or three C1 to C4 alkyl groups or C1 to C4 alkoxy groups; or a C7 to C9 phenylalkyl group that is unsubstituted or substituted by one, two or three C1 to C4 alkyl groups on the phenyl group. In Formula (c), each $X_3$ independently represents a C2 to C12 alkylene group.)

The L represents a C1 to C18 alkyl group; a C5 to C12 cycloalkyl group that is unsubstituted or substituted by one, two or three C1 to C4 alkyl groups; a C3 to C18 alkenyl group; a phenyl group that is unsubstituted or substituted by one, two or three C1 to C4 alkyl groups or C1 to C4 alkoxy groups; a C7 to C9 phenylalkyl group that is unsubstituted or substituted by one, two or three C1 to C4 alkyl groups on the phenyl group; or a C2 to C4 alkyl group substituted by a tetrahydrofurfuryl group, or at position 2, 3 or 4, by —OH, a C1 to C8 alkoxy group, a di(C1 to C4 alkyl)amino group or a group represented by following Formula (g).

[Chem. 3]

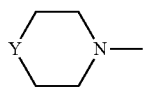

(g)

(Y in Formula (g) represents —O—, —CH$_2$—, —CH$_2$CH$_2$— or —N(CH$_3$)—.)

R in Formula (I) represents a group represented by following Formula (d).

[Chem. 4]

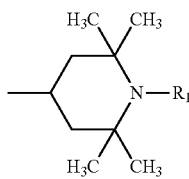

(d)

R$_1$ in Formula (d) represents a structure identical to R$_1$ in Formula (I).

B in Formula (I) represents —N(R$_7$)(R$_8$), where R$_7$ and R$_8$ are each independently selected from a hydrogen atom, a C1 to C18 alkyl group and a group represented by Formula (d).)

According to a third aspect of the present invention, in the acrylic resin composition for films as described in the first or second aspect, the content of the high-molecular-weight hindered amine-based light stabilizer (A) is at least 0.1 parts by mass to no more than 3 parts by mass relative to 100 parts by mass of the acrylic resin (B).

According to a fourth aspect of the present invention, in the acrylic resin composition for films as described in any one of the first to third aspects, an amino group outside of a piperidine backbone in the high-molecular-weight hindered amine-based light stabilizer (A) is a secondary amine or acyclic tertiary amine.

According to a fifth aspect of the present invention, in the acrylic resin composition for films as described in any one of the first to third aspects, an amino group outside of a piperidine backbone in the high-molecular-weight hindered amine-based light stabilizer (A) is an acyclic tertiary amine.

According to a sixth aspect of the present invention, in the acrylic resin composition for films as described in as described in any of the first to fifth aspects, the acrylic resin (B) is a rubber-containing polymer obtained by graft polymerizing a monomeric component (B-1-b) containing an alkyl methacrylate as a main component, under the presence of a rubber polymer (B1a) obtained by polymerizing a monomeric component (B-1-a) containing an alkyl acrylate as a main component.

According to a seventh aspect of the present invention, a method of forming a melt extrusion into a film by way of a T-die method, includes melt extruding the acrylic resin composition for films as described in any of the first to sixth aspects.

According to an eighth aspect of the present invention, an acrylic resin film having a thickness of 10 to 500 μm is obtained using the acrylic resin composition for films as described in any of the first to sixth aspects.

According to a ninth aspect of the present invention, an acrylic resin film having a thickness of 10 to 500 μm is obtained by way of the method as described in the seventh aspect.

According to a tenth aspect of the present invention, a laminate includes the acrylic resin film as described in the eighth aspect and a thermoplastic resin substrate.

According to an eleventh aspect of the present invention, in the laminate as described in the tenth aspect, the thermoplastic resin substrate is a polyvinyl chloride resin, ABS resin, polycarbonate resin or polyolefin resin.

According to a twelfth aspect of the present invention, in the laminate as described in the tenth or eleventh aspect, the thickness of the thermoplastic resin substrate is 50 to 500 μm, and the thickness of the acrylic resin film is 10 to 180 μm.

According to a thirteenth aspect of the present invention, a laminate includes the acrylic resin film as described in the ninth aspect and a thermoplastic resin substrate.

According to a fourteenth aspect of the present invention, in the laminate as described in the thirteenth, the thermoplastic resin substrate is a polyvinyl chloride resin, ABS resin, polycarbonate resin or polyolefin resin.

According to a fifteenth aspect of the present invention, in the laminate as described in the thirteenth or fourteenth, the thickness of the thermoplastic resin substrate is 50 to 500 μm, and the thickness of the acrylic resin film is 10 to 180 μm.

Effects of the Invention

When using the acrylic resin composition for films of the present invention, bleeding to the roll surface is reduced upon film formation. For this reason, it is possible to produce an acrylic resin film efficiently.

PREFERRED MODE FOR CARRYING OUT THE INVENTION (1) High-Molecular-Weight Hindered Amine-Based Light Stabilizer (A)

A high-molecular-weight hindered amine-based light stabilizer (A) contributes to light stabilization by trapping radicals generated by oxidative degradation. By joint use with an ultraviolet absorber in particular, a synergy is exhibited, imparting superior weather resistance to the resin.

Herein, high molecular weight indicates a molecular weight of at least 1000. The high-molecular-weight hindered amine-based light stabilizer has a high decomposition temperature due to being high molecular weight, and thus excels in stability during processing. The molecular weight of the high-molecules-weight hindered amine-based light stabilizer is preferably no more than 10000.

The high-molecular-weight hindered amine-based light stabilizer (A) used in the present invention has a triazine backbone in the molecule, and derived therefrom, has improved heat resistance, and superior properties such as imparting of ultraviolet absorbency. As the high-molecular-weight hindered amine-based light stabilizer (A), it is preferable to use one having the structural unit shown in Formula (I).

[Chem. 5]

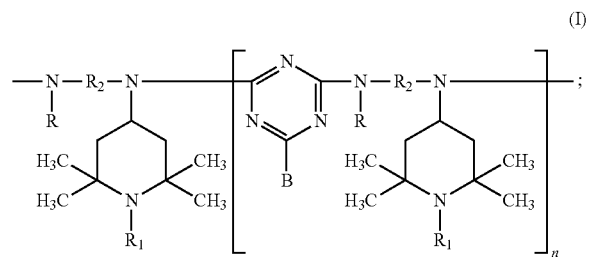

(In Formula (I), n represents 2, 3, 4 or 5.

Each $R_1$ independently represents a hydrogen atom; a C1 to C8 alkyl group; a C2 to C8 hydroxyalkyl group; a C1 to C8 cyanoalkyl group; a C3 to C6 alkenyl group or alkynyl group; a C7 to C9 phenylalkyl group that is unsubstituted or substituted by one, two or three C1 to C4 alkyl groups on the phenyl group; or a C1 to C8 acyl group.

Each $R_2$ independently represents a C2 to C12 alkylene group; a C4 to C12 alkenylene group; a C2 to C8 alkynylene group; a C5 to C7 cycloalkylene group; a C5 to C7 cycloalkylene di(C1 to C4 alkylene) group; a C1 to C4 alkylene di(C5 to C7 cycloalkylene) group; a phenylene di(C1 to C4 alkylene) group; a 1,4-piperazinediyl; a C4 to C12 alkylene group having a structure including —O— or —N($X_1$)— ($X_1$ represents a C1 to C12 acyl group, a (C1 to C12 alkoxy)carbonyl group, or a group other than a hydrogen atom that is a group represented by the below definition of $R_4$ (also called L) between a C—C bond; following Formula (a); following Formula (b) or following Formula (c).

[Chem. 6]

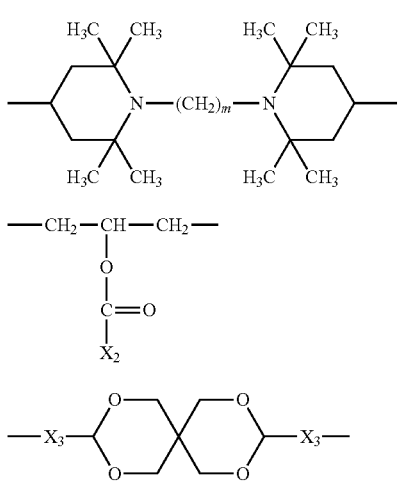

(In Formula (a), m represents 2 or 3. In Formula (b), $X_2$ represents a C1 to C18 alkyl group; a C5 to C12 cycloalkyl group that is unsubstituted or substituted by one, two or three C1 to C4 alkyl groups; a phenyl group that is unsubstituted or substituted by one, two or three C1 to C4 alkyl groups or C1 to C4 alkoxy groups; or a C7 to C9 phenylalkyl group that is unsubstituted or substituted by one, two or three C1 to C4 alkyl groups on the phenyl group. In Formula (c), each $X_3$ independently represents a C2 to C12 alkylene group.)

R in Formula (I) represents a group represented by following Formula (d).

[Chem. 7]

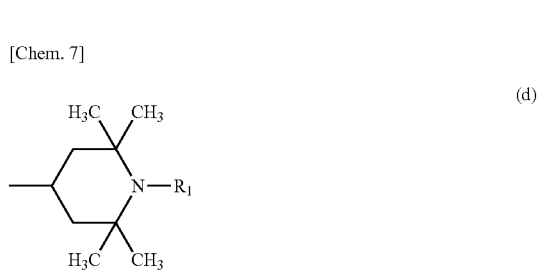

$R_1$ in Formula (d) represents a structure identical to $R_1$ in Formula (I).

B in Formula (I) represents —N($R_7$)($R_8$), where $R_7$ and $R_8$ are each independently selected from a hydrogen atom, a C1 to C18 alkyl group and a group represented by Formula (d).)

Both termini in Formula (I) are preferably a hydrogen atom or follow Formula (e).

[Chem. 8]

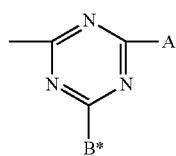

(A represents —$OR_3$, —N($R_4$)($R_5$) or following Formula (f).

[Chem. 9]

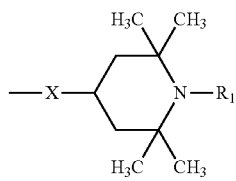

Each $R_3$, $R_4$ and $R_5$ independently represents a hydrogen atom; a C1 to C18 alkyl group; a C5 to C12 cycloalkyl group that is unsubstituted or substituted by one, two or three C1 to C4 alkyl groups; a C3 to C18 alkenyl group; a phenyl group that is unsubstituted or substituted by one, two or three C1 to C4 alkyl groups or C1 to C4 alkoxy groups; a C7 to C9 phenylalkyl group that is unsubstituted or substituted by one, two or three C1 to C4 alkyl groups on the phenyl group; or a C2 to C4 alkyl group substituted by a tetrahydrofurfuryl group, or at position 2, 3 or 4, by —OH, a C1 to C8 alkoxy group, a di(C1 to C4 alkyl)amino group or a group represented by following Formula (g).

[Chem. 10]

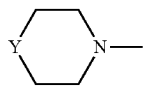

(g)

(Y in Formula (g) represents —O—, —CH$_2$—, —CH$_2$CH$_2$— or —N(CH$_3$)—.)

R$_1$ in Formula (f) represents a structure identical to R$_1$ in Formula (I). X represents —O— or —N(R$_6$)—. R$_6$ represents a hydrogen atom; a C1 to C18 alkyl group; a C3 to C18 alkenyl group; a C5 to C12 cycloalkyl group that is unsubstituted or substituted by one, two or three C1 to C4 alkyl groups; a C7 to C9 phenylalkyl group that is unsubstituted or substituted by one, two or three C1 to C4 alkyl groups on the phenyl; or a C2 to C4 alkyl group substituted by a tetrahydrofurfuryl group, or at position 2, 3 or 4, by —OH, a C1 to C8 alkoxy group, a di(C1 to C4 alkyl)amino group or a group represented by following Formula (g).

[Chem. 11]

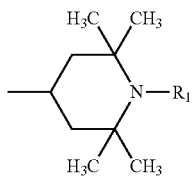

(h)

R$_1$ in Formula (h) represents a structure identical to R$_1$ in Formula (I).

B* represents one among the definitions given for A, and B* and A may be the same.).

The terminus in Formula (I) is preferably a hydrogen atom, or a group represented by Formula (e) and is A=B=—N(C$_4$H$_9$)$_2$. R$_1$ is preferably a hydrogen atom or methyl group, and is more preferably a hydrogen atom. R is preferably a group represented by Formula (d). R$_2$ is preferably —(CH$_2$)$_6$—. B is preferably —N(H)(tert.C$_8$H$_{17}$), —N(C$_4$H$_9$)(R) or a group represented by Formula (g) and Y is an oxygen atom. Tert.C$_8$H$_{17}$ is a 2,2,3,3-tetramethylbutyl group, for example.

As the high-molecular-weight hindered amine-based light absorber (A) having a structural unit shown by Formula (I), for example, CYASORB UV-3346 manufactured by Sun Chemical Corp. (trade name, in the structure shown by Formula (I), both termini are hydrogen atoms, R$_1$ is a hydrogen atom, R is a group represented by Formula (d), R$_2$ is —(CH$_2$)$_6$—, and B is represented by Formula (g) (provided that Y is —O—)); CYASORB UV-3529 manufactured by Sun Chemical Corp. (trade name, in the structure shown by Formula (I), both termini are hydrogen atoms, R$_1$ is a methyl group, R is a group represented by Formula (d), R$_2$ is —(CH$_2$)$_6$—, and B is represented by Formula (g) (provided that Y is —O—)); Chimassorb 944FDL (trade name) manufactured by BASF; Chimassorb 2020FDL (trade name) manufactured by BASF; etc. can be exemplified.

Thereamong, Chimassorb 944FDL manufactured by BASF (in the structure shown by Formula (I), both termini are hydrogen atoms, R$_1$ is a hydrogen atom, R is a group represented by Formula (d), R$_2$ is —(CH$_2$)$_6$—, and B is —N(H)(tert.C$_8$H$_{17}$))); or Chimassorb 2020FDL manufactured by BASF (both termini are groups represented by Formula (e) and are A=B*=—N(C$_4$H$_9$)$_2$, R$_1$ is a hydrogen atom, R is a group represented by Formula (d), R$_2$ is —(CH$_2$)$_6$—, and B is —N(C$_4$H$_9$)(R) is preferable.

Thereamong, in particular, Chimassorb 2020FDL manufactured by BASF (both termini are groups represented by Formula (e) and are A=B=—N(C$_4$H$_9$)$_2$, R$_1$ is a hydrogen atom, R is a group represented by Formula (d), R$_2$ is —(CH$_2$)$_6$—, and B is —N(C$_4$H$_9$)(R) is particularly preferable.

In the structure of the high-molecular-weight hindered amine-based light stabilizer (A), it is preferably for amino groups outside of the piperidine backbone to be tertiary amines. In addition, since the steric hindrance around the nitrogen atom can be made greater in the case of the tertiary amine being acyclic, compared to a case of the amino group outside of the piperidine backbone being a primary and secondary amine and a cyclic tertiary amine, it is possible to suppress side reactions within the molecule or between molecules due to the nucleophilicity of the nitrogen atom. As a result thereof, the generation of sticking to the roll and insoluble contaminants (thermally-degraded insoluble matter) can be reduced. It should be noted that contaminants in the present application are defects arising in appearance of a film obtained through melt extrusion or the like. Upon long-term continuous production, high-molecular-weight hindered amine-based light stabilizer stagnates in the dead space, etc. inside the extruder of the film making equipment, causing side-reactions depending on the type, forming insoluble contaminants, which appear in the film appearance.

The content of the high-molecular-weight hindered amine-based light stabilizer (A) is not particularly limited; however, it is preferably at least 0.1 parts by mass to no more than 3 parts by mass relative to 100 parts by mass of acrylic resin (B), more preferably at least 0.2 parts by mass to no more than 2.5 parts by mass, and even more preferably at least 0.3 parts by mass to no more than 2 parts by mass. In the case of the content being at least 0.1 parts by mass, it is possible to make the weather resistance more favorable. In the case of the content being no more than 3 parts by mass, it is possible to more effectively suppress bleeding to the roll surface from occurring upon film formation of the film, and sticking of the film to the roll from occurring. Furthermore, it is possible to more effectively reduce contaminants generating in the film obtained by film formation, by setting to this range.

It should be noted that bleeding in the present application refers to the transition of auxiliary agents contained in the film to the roll. When continuously performing film formation, components having high volatility, low thermal decomposition temperature, or the like gradually transition to the roll, and components accumulated at the roll cause defects to arise such as clinging of the film to the roll.

In addition, sticking refers to the film clinging to the roll. The extent of sticking can be evaluated by a rate of rise in detachment point. However, the position at which the film detaches from the roll is referred to as the detachment point, and is expressed as a height from the floor. The rate of rise in detachment point refers to a proportion in the change thereof, and can be calculated by the following formula.

Rate of rise in detachment point (%)=((detachment point−detachment point at start)/detachment point at start)×100

The detachability will decline when the sticking of the film to the roll becomes greater, and thus the detachment point rises.

(2) Acrylic Resin (B)

As the acrylic resin (B), it is possible to use the below rubber-containing polymer (B-1) and/or thermoplastic polymer (B-2).

<Rubber-Containing Polymer (B-1)>

The rubber-containing polymer (B-1) is a rubber-containing polymer obtained by graft polymerizing a monomeric component (B-1-b) containing an alkyl methacrylate as a main component, under the presence of a rubber polymer (B1a) obtained by polymerizing a monomeric component (B-1-a) containing an alkyl acrylate as a main component. It should be noted that "main component" in the present invention means at least 50% by mass. It should be noted that, in the present invention, polymerization of the monomeric component (B-1-a) can be performed under the presence of "fine seed particles". These fine seed particles, for example, can be manufactured by causing a monomer mixture containing at least 40% by mass methacrylic ester to polymerize. In this case, the content of "fine seed particles" in 100% by mass of the rubber-containing polymer (B-1) is preferably no more than 10% by mass. Upon polymerizing the monomeric component (B-1-a) or (B-1-b), the monomeric component (B-1-a) or (B-1-b) may be polymerized by adding in a batch into a polymerization vessel, or may be polymerized by adding divided into two or more stages. From the viewpoint of molding-whitening resistance and shock resistance, it is preferable to polymerize by dividing into two or more stages.

It should be noted that, in the present specification, "(meth)acryl" indicates "acryl" or "methacryl".

Monomeric Component (B-1-a) and Rubber Polymer (B1a)

As the alkyl acrylate in the monomeric component (B-1-a), for example, methyl acrylate, ethyl acrylate, propyl acrylate, n-butyl acrylate, 2-ethylhexyl acrylate, n-octyl acrylate or the like can be exemplified. Thereamong, n-butyl acrylate is preferable. These can be used individually or by mixing two or more types.

As monomers other than the alkyl acrylate in the monomeric component (B-1-a), for example, alkyl methacrylates, alkyl acrylates, and other monomers having double bonds that can co-polymerize with these (alkyl (meth)acrylates), polyfunctional monomers, etc. can be exemplified.

As the alkyl methacrylate, for example, one in which the alkyl group is linear or branched can be exemplified.

As specific examples of the alkyl methacrylate, for example, methyl methacrylate, ethyl methacrylate, propyl methacrylate, n-butyl methacrylate, etc. can be exemplified. These can be used individually or by mixing two or more types.

As the other monomers having a double bond that can co-polymerize with these (alkyl acrylate, alkyl methacrylate), for example, acrylic monomers such as lower alkoxy acrylates, cyanoethyl acrylate, acrylamide and (meth)acrylates; aromatic vinyl monomers such as styrene and alkyl-substituted styrenes; and vinyl cyanide monomers such as acrylonitrile and methacrylonitrile can be exemplified. These can be used individually or by mixing two or more types.

As the polyfunctional monomer, cross-linking monomers having at least two co-polymerizable double bonds in one molecule can be exemplified. As specific examples of the polyfunctional monomer, alkylene glycol di(meth)acrylates such as ethylene glycol di(meth)acrylate, 1,3-butylene glycol di(meth)acrylate, 1,4-butylene glycol di(meth)acrylate and propylene glycol di(meth)acrylate; polyvinylbenzenes such as divinylbenzene and trivinylbenzene; and allyl, metallyl or crotyl esters of cyanurate monomer such as triallyl cyanurate and triallyl isocyanurate, and $\alpha,\beta$-unsaturated carboxylic acids or dicarboxylic acids such as allyl methacrylate; etc. can be exemplified. These can be used individually or by mixing two or more types.

The content of the alkyl acrylate in the monomeric component (B-1-a) is preferably 50 to 99.9% by mass.

The content of the alkyl methacrylate in the monomeric component (B-1-a) is preferably 0 to 49.9% by mass.

The content of the other monomer having a double bond that can co-polymerize with these in the monomeric component (B-1-a) is preferably 0 to 20% by mass.

The content of the polyfunctional monomer in the monomeric component (B-1-a) is preferably 0.1 to 10% by mass.

The glass transition temperature (hereinafter referred to as Tg) of the rubber polymer (B1a) is preferably less than 25° C., more preferably no higher than 10° C., and particularly preferably no higher than 0° C. from the point of flexibility of the rubber-containing polymer (B-1). In addition, the Tg of the rubber polymer (B1a) is preferably at least −130° C., and more preferably at least −80° C.

It should be noted that, in the present invention, Tg refers to the value calculated from the formula of FOX using the value listed in a polymer handbook (Polymer Handbook (J. Brandrup, Interscience, 1989)).

The content of the monomeric component (B-1-a) in the rubber-containing polymer (B-1) (monomeric component (B-1-a)+monomeric component (B-1-b)+monomeric component (B-1-c)=100% by mass) is preferably 5 to 80% by mass, and more preferably 20 to 70% by mass, from the point of film formability, molding-whitening resistance, heat resistance and flexibility.

Monomeric Component (B-1-b)

The rubber-containing polymer (B-1) is a rubber-containing polymer obtained by graft polymerizing the monomeric component (B-1-b) containing the alkyl methacrylate as a main component under the presence of the rubber polymer (B1a).

In addition to the alkyl methacrylate, the monomeric component (B-1-b) can contain an alkyl acrylate and other monomers having a double bond that can co-polymerize with these (alkyl (meth)acrylates). Specifically, those given in the explanation of the rubber polymer (B1a) can be used.

The content of the alkyl methacrylate in the monomeric component (B-1-b) is preferably 51 to 100% by mass.

The content of the alkyl acrylate in the monomeric component (B-1-b) is preferably 0 to 20% by mass.

The content of the other monomers having a double bond that can co-polymerize with these in the monomeric component (B-1-b) is preferably 0 to 49% by mass.

The Tg of the monomer of the monomeric component (B-1-b) is preferably 50 to −110° C. from the point of heat resistance and ease of production of the rubber-containing polymer (B-1).

The content of the monomeric component (B-1-b) (monomeric component (B-1-a)+monomeric component (B-1-b)+monomeric component (B-1-c)=100% by mass) is preferably 15 to 90% by mass, and more preferably 30 to 80% by mass from the point of film formability, molding-whitening resistance, heat resistance and flexibility.

Monomeric Component (B-1-c)

Prior to polymerizing the monomeric component (B-1-b), the monomeric component (B-1-c) containing 9.9 to 90% by mass of alkyl acrylate, 9.9 to 90% by mass of alkyl methacrylate, 0 to 20% by mass of the other monomer having a double bond that can co-polymerize with these (alkyl (meth) acrylates), and 0.1 to 10% by mass of the polyfunctional monomer, may be polymerized under the presence of the rubber polymer (B1a). As the monomers used herein, those given in the explanation of the rubber polymer (B1a) can be used specifically.

As the Tg of individual polymers obtained by polymerizing the monomeric component (B-1-c), it is preferably higher than the Tg of the rubbery polymer (B1a) in the point of molding-whitening resistance of the acrylic resin film.

The Tg of the individual monomer obtained from the monomeric component (B-1-c) is preferably 25 to 100° C. The lower limit value of the Tg of an individual polymer obtained from the monomeric component (B-1-c) is preferably at least 25° C., more preferably at least 40° C., and particularly preferably at least 50° C., from the point of heat resistance and flexibility. In addition, the upper limit value of the Tg of an individual polymer obtained from the monomeric component (B-1-c) is preferably no higher than 100° C., more preferably no higher than 80° C., and particularly preferably no higher than 70° C., from the point of film formability and molding-whitening resistance.

The content of the monomeric component (B-1-c) (monomeric component (B-1-a)+monomeric component (B-1-b)+ monomeric component (B-1-c)=100% by mass) is preferably 5 to 35% by mass, and more preferably 5 to 20% by mass, from the point of film formability, molding-whitening resistance, heat resistance and flexibility.

<Production Method of Rubber-containing Polymer (B-1)>

As the production method of the rubber-containing polymer (B-1), for example, a sequential multi-step emulsion polymerization method, and an emulsification-suspension polymerization method that causes to change over to suspension polymerization during polymerization of the monomeric component (B-1-b) after sequential multi-step emulsion polymerizing the monomeric component (B-1-c) under the presence of the rubbery polymer (B1a) can be exemplified.

As a method of producing the rubber-containing polymer (B-1) by the sequential multi-step emulsion polymerization method, for example, a method of feeding the monomeric component (B-1-c) and monomeric component (B-1-b) respectively in order to a reactor and polymerizing, after feeding an emulsified liquid prepared by mixing the monomeric component (B-1-a) for obtaining the rubbery polymer (B1a), water and a surfactant into a reactor and polymerizing can be exemplified.

The rubbery polymer (B1a) may be obtained by feeding the emulsified liquid prepared by mixing the monomeric component (B-1-a), water and surfactant and polymerizing, under the presence of a polymer other than the rubbery polymer (B1a).

The acrylic resin film obtained using the rubber-containing polymer (B-1) obtained by the above-mentioned method is preferable in the point of characteristics like the small number of fish-eyes in the film.

As the surfactant used upon producing the rubber-containing polymer (B-1) by the sequential multi-step emulsion polymerization method, for example, anionic, cationic and nonionic surfactants can be exemplified. These can be used individually or by mixing two or more types.

As the anionic surfactant, for example, carboxylate salts such as rosin soap, potassium oleate, sodium stearate, sodium N-lauroylsarcosinate and dipotassium alkenylsuccinate; sulfate salts such as sodium lauryl sulfate; sulfonates such as sodium dioctyl sulfosuccinic acid, sodium dodecyl benzene sulfonic acid and sodium alkyl diphenylether disulfonic acid; and phosphoric acid ester salts such as sodium polyoxyethylene alkylphenyl ether phosphate and polyoxyethylene alkyl ether phosphate can be exemplified.

As specific examples of commercial products of anionic surfactants, ELEMINOL NC-718 manufactured by Sanyo Chemical Industries, Ltd., Phosphanol LS-529, Phosphanol RS-610NA, Phosphanol RS-620NA, Phosphanol RS-630NA, Phosphanol RS-640NA, Phosphanol RS-650NA and Phosphanol RS-660NA manufactured by Toho Chemical Industry Co., Ltd., and LATEMUL P-0404, LATEMUL P-0405, LATEMUL P-0406 and LATEMUL P-0407 manufactured by Kao Corporation (all trade names) can be exemplified.

As a method of preparing the emulsified liquid by mixing the monomeric component (B-1-a), water and surfactant, for example, a method of charging surfactant after loading the monomeric component (B-1-a) in water; a method of charging the monomeric component (B-1-a) after loading the surfactant in water; and a method of charging water after loading surfactant into the monomeric component (B-1-a) can be exemplified.

As the mixing device for preparing the emulsified liquid by mixing the monomeric component (B-1-a) with water and surfactant, for example, a mixer equipped with an impeller; a forced emulsification device such as a homogenizer or homomixer; and a film emulsifying apparatus can be exemplified.

As the above-mentioned emulsified liquid, it is possible to use with either dispersions of W/O type in which water droplets disperse in oil of the monomeric component (B-1-a), or O/W type in which oil droplets of the monomeric component (B-1-a) disperse in water.

The latex of the rubber-containing polymer (B-1) obtained by the above-mentioned method can be treated using a filtration device in which filter media is arranged as necessary. This filtration treatment is used in the removal of scale occurring during polymerization from the latex of the rubber-containing polymer (B-1), or in the removal of impurities mixed into the polymerization raw materials or into the polymer from outside.

As the above-mentioned filtration device to which the filter media is arranged, for example, a GAF filter system manufactured by ISP Filters PTE Limited using a bag-like mesh filter; a centrifugal filtration device arranging cylindrical-type filter media at an inner face inside a cylindrical-type filtration chamber and arranging an impeller inside of the filter media; and a vibration-type filtration device in which the filter media makes a horizontal circular motion and vertical swinging motion relative to the filter media face can be exemplified.

The rubber-containing polymer (B-1) can be obtained as a powdery material by recovering from latex containing the rubber-containing polymer (B-1).

As the method of recovering the rubber-containing polymer (B-1) from the latex containing the rubber-containing polymer (B-1), for example, a solidification method by salting out or acid deposition, spray-drying method and freeze-drying method can be exemplified.

In the case of recovering the rubber-containing polymer (B-1) by a solidification method by way of salting out pressing using a metallic salt, it is preferable to set the residual metal content in the rubber-containing polymer (B-1) ultimately obtained to no more than 800 ppm, and the residual metal content is preferably as a very small amount.

In the case of using a metallic salt having strong affinity to water such as calcium, magnesium and sodium, preferably calcium salt, as the metallic salt in the above-mentioned salting out processing, the bleaching upon immersing the acrylic resin film in boiling water can be easily suppressed by decreasing the residual metal content in the multi-layer structure polymer (1) as much as possible.

As the polymerization initiator and chain-transfer agent used upon polymerizing the monomeric component (B-1-a), monomeric component (B-1-b) and monomeric component (B-1-c) in the rubber-containing polymer (B-1), well-known ones can be used, and as the addition method thereof, a method of adding to either one of the aqueous phase and monomer phase, or a method of adding to both can be exemplified.

As the above-mentioned polymerization initiator, for example, peroxide, an azo initiator and a redox initiator combining peroxide or azo initiator with an oxidizer/reductant can be exemplified.

As specific examples of the redox initiator, a sulfoxylate-based initiator produced by combining ferrous sulfate, ethylenediaminetetraacetic acid disodium salt, Rongalite and hydroperoxide can be exemplified.

As the above-mentioned chain-transfer agent, for example, a C2 to C20 alkyl mercaptan, mercapto acids, thiophenol and carbon tetrachloride can be exemplified. These can be used individually or by mixing two or more types. As the alkyl mercaptan, for example, n-octylmercaptan can be exemplified.

As the production method of the latex of the rubber-containing polymer (B-1), in a case of using a method of polymerizing the monomeric component (B-1-c) and monomeric component (B-1-b) by feeding each in order to the reactor after polymerizing the monomeric component (B-1-a) by feeding an emulsified liquid prepared by mixing water and surfactant to the reactor, a method is preferable that heats an aqueous solution in a polymerization vessel containing ferrous sulfate, ethylenediaminetetraacetic acid disodium salt and Rongalite up to the polymerization temperature, followed by polymerizing the monomeric component (B-1-a) by feeding an emulsified liquid prepared by mixing with water and surfactant into the reactor, then polymerizes the monomeric component (B-1-c) and the monomeric component (B-1-b) by feeding sequentially to the reactor.

Although differing according to the type and amount of polymerization initiator and the like used, for example, 40 to 120° C. can be exemplified as the polymerization temperature for obtaining the latex of the rubber-containing polymer (B-1).

<Thermoplastic Polymer (B-2)>

The thermoplastic polymer (B-2) is a polymer with an alkyl methacrylate as a main component.

As the polymer with alkyl methacrylate units as a main component, a polymer obtained by polymerizing a monomeric component containing 50 to 100% by mass of the alkyl methacrylate, 0 to 50% by mass of the alkyl acrylate and 0 to 49% by mass of the other monomer having a double bond that can co-polymerized with these is preferable from the point of heat resistance of the acrylic resin film.

These polymers can specifically employ those given in the explanation of the rubber polymer (B1a). These can be used individually or by mixing two or more types.

The content of the alkyl methacrylate is preferably 50 to 100% by mass, more preferably 85 to 99.9% by mass, and particularly preferably 92 to 99.9% by mass, from the point of heat resistance of the acrylic resin film.

The content of the alkyl acrylate is preferably 0 to 40% by mass, more preferably 0.1 to 15% by mass, and particularly preferably 0.1 to 8% by mass, from the point of heat resistance of the acrylic resin film.

The content of the other monomer having a double bond that can co-polymerize with these is preferably 0 to 49% by mass from the point of heat resistance of the acrylic resin film.

As the polymerization method of the thermoplastic polymer (B-2), for example, a suspension polymerization method, emulsion polymerization method and bulk polymerization method can be exemplified.

The acrylic resin (B) preferably contains the rubber-containing polymer (B-1) and thermoplastic polymer (B-2). By varying the ratio of the rubber-containing polymer (B-1) and thermoplastic polymer (B-2), it is possible to easily adjust the heat resistance and flexibility of the acrylic resin film.

The contents of the rubber-containing polymer (B-1) and thermoplastic polymer (B-2) in the acrylic resin are not particularly limited; however, it is preferably 10 to 100% by mass of the rubber-containing polymer (B-1) and 0 to 90% by mass of the thermoplastic polymer, and more preferably 20 to 95% by mass of the rubber-containing polymer (B-1) and 5 to 80% by mass of the thermoplastic polymer (B-2).

The mass average molecular weight of the thermoplastic polymer (B-2) is preferably 5000 to 200000, and more preferably 30000 to 170000.

(3) Piperidine Backbone

In the present invention, piperidine backbone refers to a backbone in which $R_1$ of Formula (d) is a hydrogen atom. In other words, it refers to a 2,2,6,6 tetramethylpiperidyl group.

(4) Ultraviolet Absorber

When listing examples of types of ultraviolet absorbers that can be used in the present invention, they are as follows.

Benzotriazole-based ultraviolet absorbers, benzophenone-based ultraviolet absorbers, benzoate-based ultraviolet absorbers, cyanoacrylate-based ultraviolet absorbers and triazine-based ultraviolet absorbers, etc. can be exemplified. As these compounds and commercial products of compositions containing these compounds, for example, trade names TINUVIN 234 and TINUVIN 1577 manufactured by Chiba Specialty Chemicals; trade names ADK STAB LA-31, ADK STAB LA-32 and ADK STAB LA-46 manufactured by ADEKA; and trade name Uvinul 3035 manufactured by BASF can be exemplified.

The molecular weight of the ultraviolet absorber is preferably at least 300, and more preferably at least 400. When using an ultraviolet absorber having a molecular weight of at least 300, it is possible to suppress volatilization of the ultraviolet absorber in the case of reducing pressure in the extrusion process and film formation process, and adhesion in the film formation process due to such volatilization to various rolls can be prevented. In addition, ultraviolet absorbers of higher molecular weight are generally preferable in the point of long-term bleedout from the acrylic resin film hardly occurring, and thus maintaining appearance over a long period.

The amount of ultraviolet absorber is preferably 0 to 3.0 parts by mass, and more preferably 0.5 to 2.0 parts by mass relative to 100 parts by mass of the acrylic resin (B).

(5) Antioxidant

When listing examples of types of antioxidants that can be used in the present invention, they are as follows.

Phenol-based antioxidants, phosphite-based antioxidants, thioether-based antioxidants, etc. can be exemplified. As these compounds and commercial products of compositions containing these compounds, for example, trade name Irganox 1076 manufactured by BASF; trade names AO-40 and PEP-36 manufactured by ADEKA; etc. can be exemplified.

The amount of antioxidant is preferably 0.01 to 1 parts by mass, and more preferably 0.05 to 0.5 parts by mass relative to 100 parts by mass of the acrylic resin (B).

(6) Processing Aid

The processing aids that can be used in the present invention, for example, are polymers consisting of 50 to 100% by mass of methyl methacrylate, and 0 to 50% by mass of at least one vinyl monomer that can co-polymerize with this. As the vinyl monomers that can copolymerize with methyl methacrylate that is used, for example, aromatic vinyl monomers, vinyl cyanide monomers, alkyl methacrylates other than methyl methacrylate, and alkyl acrylates can be exemplified. As specific examples of the aromatic vinyl monomers, styrene, α-substituted styrene, nuclear-substituted styrene and derivatives thereof (for example, α-methylstyrene, chloro-styrene, vinyl toluene) can be exemplified. As specific examples of vinyl cyanide monomers, acrylonitrile and methacrylonitrile can be exemplified. As specific examples of the alkyl methacrylate other than methyl methacrylate, ethyl methacrylate, propyl methacrylate and butyl methacrylate can be exemplified. The reduced viscosity thereof (dissolving 0.1 g of polymer in 100 ml of chloroform, and measuring at 25° C.) is preferably 0.2 to 2 L/g, more preferably 0.2 to 1.2 L/g, and particularly preferably 0.2 to 0.8 L/g. By using this processing aid, it is possible to raise the moldability of the acrylic resin composition. The processing aid is commercially available as Methablen P manufactured by Mitsubishi Rayon Co., Ltd.

(7) Film Production Method

The film of the present invention, for example, is produced by a method of film formation by melt extruding the acrylic resin composition, then causing the obtained melt extruded product to come into contact with at least one cooling roll having a surface temperature of 35 to 95° C., preferably 40 to 90° C., and more preferably 45 to 85° C. As the melt extrusion method, for example, the T-die method, inflation method, etc. can be exemplified. Thereamong, the T-die method is preferable from the viewpoint of economy. The melt extrusion temperature is preferably 150 to 235° C. In addition, as the extruder, for example, a single screw extruder and twin-screw extruder can be exemplified.

Cooling roll, for example, is a roll that can adjust the temperature of the surface using coolant. The melt extruded product discharged from the T-die contacts the cooling roll, and is cooled to the surface temperature of the cooling roll. As the cooling roll, for example, it may be a mirror-surface touch roll made of metal or an endless belt made of metal. The cooling roll may be employed as one or a plurality. With two cooling rolls, a film may be formed by sandwiching the melt extruded product therebetween.

The setting temperature of the T-die in the case of producing a film by the T-die method is preferably no higher than 280° C., more preferably no higher than 270° C., and even more preferably no higher than 260° C., due to a film having a small Haze value being obtained even in a case of setting the cooling roll temperature to be high.

In addition, since a film without foreign substances in which raw materials completely melt is obtained, the setting temperature of the T-die is preferably at least 200° C., more preferably at least 210° C., and even more preferably at least 220° C.

The aperture of the T-die lip in the case of producing a film by way of the T-die method is preferably at least 0.2 mm, more preferably at least 0.4 mm, and even more preferably 0.6 mm, due to a film having uniform physical properties in the flow direction being obtained. In addition, due to a film having little film thickness variation in the width direction being obtained, the aperture of the T-die lip is preferably no more than 1 mm, more preferably no more than 0.8 mm, and even more preferably no more than 0.6 mm.

The rotation speed of the cooling roll (film drawing speed) is preferably 1 to 20 m/min.

By setting the surface temperature of the cooling roll to at least 35° C., it is possible to obtain a film having high heat resistance. In addition, by setting the surface temperature of the cooling roll to no higher than 95° C., it is possible to obtain a film having high transparency.

The present invention can produce a film by, for example, contacting the melt extruded product with the cooling roll. In the case of producing a film of two or more layers including the film of the present invention and another film, the film of the present invention may be made to contact the cooling roll directly by setting as a cooling roll side, or the other film may be made to contact indirectly via the other via by setting the other film as the cooling roll side. According to the cooling method thereof, a film having little arithmetic average roughness is obtained also on the non-cooling roll face side.

By forming a film by way of the above-mentioned cooling method, it is possible to raise the surface smoothness of the obtained film, and printing voids can be suppressed in the case of print processing on this film.

In addition, with the method of film forming by sandwiching the melt extruded product by a plurality of cooling rolls, it is preferable to sandwich the melt extruded product in a state with substantially no bank (resin pooling), and causing surface transfer without substantially extending by applying pressure.

In the case of forming a film without forming a bank, since the melt extruded product in the cooling process is surface transferred without being extended by applying pressure, it is possible to decrease the heat shrinkage of the film formed by this method.

It should be noted that, in the case of forming a film by way of sandwiching the melt extruded product with a plurality of cooling rolls, by conducting shape machining such as embossing and matt finishing on the surface of at least one cooling roll, these shapes can be made to transfer to one or both faces of the film.

<Laminated Film or Sheet>

The film obtained by the production method of the present invention may further laminate a thermoplastic resin layer to make a laminated film or sheet.

The material of the thermoplastic resin film is not particularly limited; however, a well-known thermoplastic resin can be used, for example. For example, the following resins can be exemplified as the thermoplastic resin. Acrylic resin; ABS resin (acrylonitrile-butadiene-styrene co-polymer); AS resin (acrylonitrile-styrene co-polymer); polyvinyl chloride resin; polyolefin resins such as polyethylene, polypropylene, polybutene and polymethylpentene; polyolefin co-polymers such as ethylene-vinyl acid co-polymers or saponification products thereof, and ethylene-(meth)acrylic acid ester co-polymers; polyester resins such as polyethylene terephthalate, polybutylene terephthalate, polyethylene naphthalate, polyarylate and polycarbonate; polyamide resins such as 6-nylon, 6,6-nylon, 6,10-nylon and 12-nylon; polystyrene resin; cellulose derivatives such as cellulose acetate and nitrocellulose; fluorine-based resins such as polyvinyl fluoride, polyvinylidene fluoride, polytetrafluoroethylene and ethylene-tetrafluoroethylene co-polymers; etc. or a copolymer or mixture of two, three or more types selected from these, composite, laminate, etc.

General compounding agents, for example, stabilizers, antioxidants, lubricants, processing aids, plasticizers, impact resistance agents, foaming agents, fillers, antimicrobials, anti-mold agents, mold release agents, antistatic agents, pigments, ultraviolet absorbers, light stabilizers, thermal stabilizers, flame retardants, etc., may be blended as necessary into the material of the thermoplastic resin layer.

The thickness of the thermoplastic resin layer may be appropriately decided as necessary, and is preferably set to 1 to 500 μm. The thermoplastic resin layer preferably has a thickness of a degree that absorbs surface defects of the substrate, in which the appearance of the film presents a perfectly smooth top surface.

As the method of obtaining the laminated film or sheet, for example, well-known methods such as a coextrusion method, coating, heat lamination, dry lamination, wet lamination, and hot-melt lamination can be exemplified. In addition, it is possible to laminate the film and thermoplastic resin layer by way of extrusion lamination.

(8) Laminate

The acrylic resin film of the present invention can be used by laminating onto a variety of thermoplastic resin substrates. As the thermoplastic resin substrate, for example, polyvinyl chloride resin, ABS resin, polycarbonate resin, polyolefin resin, or the like can be exemplified. These can be used individually or by mixing two or more types. The thickness of the thermoplastic resin substrate is preferably 50 to 500 μm, and the thickness of the acrylic resin film is preferably 10 to 180 μm.

The thickness of the film obtained using the acrylic resin composition for films of the present invention is preferably at least 10 μm, preferably no more than 300 μm, and more preferably no more than 180 μm.

EXAMPLES

Hereinafter, the present invention will be explained based on Examples. It should be noted that "parts" represents "parts by mass", and "%" represents "% by mass" in the following. In addition, the reference symbols used in the following explanation are as follows.

MMA: Methyl methacrylic acid
MA: Methyl acrylate
N-BA: n-butyl acrylate
1,3-BD: 1,3-butylene glycol dimethacrylate
AMA: allyl methacrylate
CHP: cumene hydroperoxide
t-BH: t-butyl hydroperoxide
n-OM: n-octylmercaptan
EDTA: disodium ethylenediaminetetraacetate
SFS: sodium formaldehyde sulfoxylate (Rongalite)
RS610NA: polyoxyethylene alkylether sodium phosphate (trade name: Phosphanol RS610NA, manufactured by Toho Chemical Industry Co., Ltd.)

Preparation Example I

Production of Rubber-Containing Polymer (B-1)

After loading 10.8 parts of deionized water into a container equipped with a stirrer, a monomeric component containing 0.3 parts of MMA, 4.5 parts of n-BA, 0.2 parts of 1,3-BD, 0.05 parts of AMA and 0.025 parts of CHP was changed thereto, and stirred to mix under room temperature.

Next, while stirring inside of the container, 1.3 parts of RS610NA was charged as the emulsifier, and stirring was continued for 20 minutes to prepare an emulsified liquid.

Into a reaction vessel equipped with a stirrer and reflux condenser, 139.2 parts of deionized water were charged, and then heated to 75° C.

Furthermore, a mixture prepared by adding 0.20 parts of SFS, 0.0001 parts of ferrous sulfate and 0.0003 parts of EDTA to 5 parts of ion-exchange water was charged at once into the above-mentioned reaction vessel.

Next, while stirring inside of the reaction vessel under nitrogen, after the above-mentioned emulsified liquid was added drop-wise into a polymerization vessel over 8 minutes while performing stirring at 75° C. under a nitrogen atmosphere, the reaction was allowed to continue for 15 minutes to obtain a latex of polymer.

Subsequently, after adding drop-wise into the reaction vessel over 90 minutes while performing stirring, at 75° C. under a nitrogen atmosphere, of a monomeric component containing 9.6 parts of MMA, 14.4 parts of n-BA, 1.0 part of 1,3-BD and 0.25 parts of AMA together with 0.016 parts of CHP, the reaction was allowed to continue for 60 minutes to obtain a latex of rubbery polymer. The Tg of the rubbery polymer was −17° C.

Furthermore, after adding drop-wise into the reaction vessel over 45 minutes while performing stirring, at 75° C. under a nitrogen atmosphere, of a monomeric component (Tg=60° C.) containing 6 parts of MMA, 4 parts of MA and 0.075 parts of AMA together with 0.0125 parts of CHP, the reaction was allowed to continue for 60 minutes.

Subsequently, after adding drop-wise into the reaction vessel over 140 minutes while performing stirring at 75° C. under a nitrogen atmosphere of a monomeric component (Tg=99° C.) containing 57 parts of MMA, 3 parts of MA, 0.264 parts of n-OM and 0.075 parts of t-BH, the reaction was allowed to continue for 60 minutes to obtain a latex of rubber-containing polymer (B-1).

After filtrating the obtained latex of rubber-containing polymer (B-1) using vibration-type filtration equipment to which a mesh (average sieve opening: 62 μm) made of stainless steel was installed to the filter media, it was made to salt out in an aqueous solution containing 3.5 parts of calcium acetate in 257 parts of deionized water, recovered by water washing, followed by drying to obtain the rubber-containing polymer (B-1) in powder form.

In the rubber-containing polymer, the content of monomeric component (B-1) was 30%, the content of monomeric component (B-1-c) was 10%, and the content of monomeric component (B-1-b) was 60%.

Example 1

Acrylic resin: rubber-containing polymer (B-1) 100 parts
Ultraviolet absorber: LA-31RG (manufactured by ADEKA) 1.9 parts
High-molecular-weight hindered amine-based light stabilizer: Chimassorb 2020 FDL (manufactured by BASF) 0.3 parts
Antioxidant: Irganox 1076 (manufactured by BASF) 0.1 parts
Processing aid: Methablen P551A (manufactured by Mitsubishi Rayon Co., Ltd.) 2 parts The above-mentioned materials were stirred to mix in a Henschel mixer to obtain a powder mixture. The obtained powder mixture was fed to a degassing-type extruder heated to 230° C. (manufactured by Toshiba Machine Co., Ltd.), and kneaded to obtain pellets.

The obtained pellets were dried for 24 hours at 80° C. These dry pellets were fed to a 40-mm diameter non-vented screw-type extruder (L/D=26) to which a T-die having a 300 mm width was installed, thereby obtaining a film of 50 μm thickness.

Example 2

Pellets A were obtained similarly to Example 1 except for setting the added number of parts of high-molecular-weight hindered amine-based light stabilizer Chimassorb 2020FDL (manufactured by BASF) to 1.5 parts.

In addition, kneading was initiated after feeding the powder mixture to the extruder and causing to stagnate in a state in which the material filled inside the barrel for 3 hours, thereby obtaining stagnant pellets.

Thereafter, the obtained pellets A and stagnant pellets were dried for 24 hours at 80° C. to obtain dry pellets A and dry stagnant pellets. Then, by mixing at a proportion of 1 part by mass of dry stagnant pellets relative to 20 parts by mass of dry pellets A, and feeding to the 40 mm diameter non-vented screw-type extruder (L/D=26) to which a T-die of 300 mm width was installed, a film of 50 μm thickness was obtained.

Example 3

A film was obtained similarly to Example 1, except for setting the high-molecular-weight hindered amine-based light stabilizer as Chimassorb 944FDL (manufactured by BASF) (added amount 0.3 parts).

Example 4

A film was obtained similarly to Example 2, except for setting the high-molecular-weight hindered amine-based light stabilizer as Chimassorb 944FDL (manufactured by BASF), and setting the added amount to 1.5 parts.

Example 5

A film was obtained similarly to Example 1, except for setting the high-molecular-weight hindered amine-based light stabilizer as CYASORB UV-3346 (manufactured by Sun Chemical Corp.) (added amount 0.3 parts).

Example 6

A film was obtained similarly to Example 1, except for setting the high-molecular-weight hindered amine-based light stabilizer as CYASORB UV-3592 (manufactured by Sun Chemical Corp.) (added amount 0.3 parts).

Comparative Example 1

A film was obtained similarly to Example 1, except for setting the high-molecular-weight hindered amine-based light stabilizer as the low-molecular-weight hindered amine-based light stabilizer LA-57 (manufactured by ADEKA).

However, since the molecular weight of LA-57 is low, bleeding of the light stabilizer to the roll and sticking of the film to the roll were recognized, and thus stable production was not possible.

Comparative Example 2

A film was obtained similarly to Example 2, except for setting the high-molecular-weight hindered amine-based light stabilizer as the low-molecular-weight hindered amine-based light stabilizer LA-57 (manufactured by ADEKA), and setting the number of parts added to 1.5 parts.

However, bleeding of the light stabilizer to the roll and sticking of the film to the roll were recognized, and thus stable production was not possible. The generation of contaminants on the film was further recognized.

TABLE 1

|  | Type of light stabilizer | Number of parts added | Bleeding to roll | Sticking to roll Rate of rise in detachment point | Generation on contaminants in film Number of defects/ 100 cm2 |
| --- | --- | --- | --- | --- | --- |
| Example 1 | Chimassorb 2020FDL | 0.3 | ○ | ○ | ○ |
| Example 2 | Chimassorb 2020FDL | 1.5 | ○ | ○ Less than 2% | ○ 1 or less |
| Example 3 | Chimassorb 944FDL | 0.3 | ○ | ○ | ○ |
| Example 4 | Chimassorb 944FDL | 1.5 | Δ | x 25% | x 100 or more |
| Example 5 | CYASORB UV-3346 | 0.3 | ○ | x 30% | Δ 5 or less |
| Example 6 | CYASORB UV-3529 | 0.3 | ○ | x 30% | Δ 5 or less |
| Comparative Example 1 | LA-57 | 0.3 | x | x | ○ |
| Comparative Example 2 | LA-57 | 1.5 | x | x Not implemented due to X in Comparative Example 1 | Δ 5 or less |

A film was prepared through normal kneading and film formation steps for a defined number of parts added of 0.3 parts. Since the influence of the thermal history due to stagnation is remarkable in the aforementioned way, a film was prepared using pellets obtained by forcibly causing a number of parts added of 1.5 parts assuming a master batch to stagnate for 3 hours at 240° C. while kneading.

Since the hindered amine-based light stabilizer (A) used in Examples 1 and 2 can suppress side reactions within molecules and between molecules due to the nucleophilicity of nitrogen atoms, since the amino groups other than the piperidine backbone are tertiary amines, the generation of insoluble contaminants hardly occurs even at the high concentration of 1.5 parts for the added number of parts. In addition, the thermal decomposition temperature is high due to this light stabilizer being high molecular weight, and thus bleeding hardly occurs. In the hindered amine-based light stabilizer (A) used in Example 3, a part of the amino groups other than the piperidine backbone (nitrogen atoms to which substituent B binds) become secondary amines; however, since the tertiary octyl group binding to this amino group is bulky, nucleophilic reaction of nitrogen atoms hardly occurs, and for this reason, the generation of contaminants hardly occurs. In addition, since this light stabilizer is a high molecular weight, the thermal decomposition temperature is high and bleed hardly occurs.

For Examples 1, 3, 5 and 6, and Comparative Example 1 (number of parts added of 0.3 parts), films were prepared through normal kneading and film formation processes. For Examples 2 and 4, and Comparative Example 2 (number of parts added of 1.5 parts) assuming a master batch, in order to evaluate the influence of thermal history due to stagnation, films were prepared using pellets obtained by forcibly stagnating for 3 hours at 240° C. while kneading.

For the prepared films, the generation of contaminants was evaluated, and bleeding and sticking to the roll were further evaluated. More specifically, the prepared films were passed by rolls heated to 150° C. at a speed of 5 m/min, and wound at a speed of 5.4 m/min. Then, bleeding and sticking at the moment of winding 1500 m were confirmed.

(Evaluation Criterion)

Bleeding to Roll x: sufficient amount of bleeding to influence sticking to roll, and quantitative analysis possible.

Δ: although at a level influencing sticking to roll, bleeding amount is slight, and quantitative analysis is difficult.

o: no bleeding

Roll Sticking Property

The roll sticking property was evaluated by the rate of rise in detachment point. However, the position at which the film detaches from the roll is referred to as the detachment point, and the detachment point is expressed by the height from the floor. The rate of rise in detachment point refers to a proportion in the change thereof, and can be calculated by the following formula.

Rate of rise in detachment point (%)=((detachment point when 1500 m wound−detachment point at film formation start)/detachment point at film formation start)×100

The detachability will decline when the sticking of the film to the roll becomes greater, and thus the detachment point rises.

In addition, it was evaluated by the following criteria also visually.

x: sticking o: none

Generation of Contaminants on Film x: contaminants generated in large quantity

Δ: few contaminants generated, but not problem in use o: contaminants not generated

The invention claimed is:

1. An acrylic resin film obtained from an acrylic resin composition, the acrylic resin composition comprising a high-molecular-weight hindered amine-based light stabilizer (A) having a triazine backbone and an acrylic resin (B), wherein:

the high-molecular-weight hindered amine-based light stabilizer (A) is present in an amount of at least 0.1 parts by mass to no more than 3 parts by mass relative to 100 parts by mass of the acrylic resin (B), the acrylic resin (B) is a rubber-containing polymer (B-1) obtained by graft polymerizing a monomeric component (B-1-b) containing an alkyl methacrylate as a main component, in the presence of a rubber polymer (B1a) obtained by polymerizing a monomeric component (B-1-a) containing an alkyl acrylate as a main component, wherein a content of the monomeric component (B-1-a) in the rubber-containing polymer (B-1) is 5 to 80 wt %, and a content of the monomeric component (B-1-b) in the rubber-containing polymer (B-1) is 15 to 90 wt %, wherein prior to polymerizing the monomeric component (B-1-b), a monomeric component (B-1-c) containing 9.9 to 90% mass of an alkyl acrylate, 9.9 to 90% by mass of an alkyl methacrylate, 0 to 20% by mass of another monomer having a double bond that can co-polymerize with the alkyl acrylate and the alkyl methacrylate, and 0.1 to 10% by mass of a polyfunctional monomer is polymerized in the presence of a rubber polymer (B1a), and the high-molecular-weight amine-based light stabilizer (A) comprises a structural piperidine backbone unit represented by Formula (I)

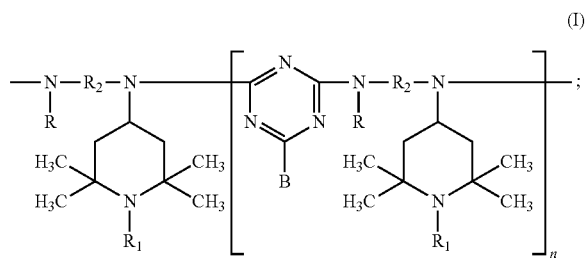

wherein in Formula (I):

all amino groups outside of all of the piperidine backbone units are acyclic tertiary amines;

n represents 2, 3, 4 or 5;

each $R_1$ independently represents a hydrogen atom; a C1 to C8 alkyl group; a C2 to C8 hydroxyalkyl group; a C1 to C8 cyanoalkyl group; a C3 to C6 alkenyl group or alkynyl group; a C7 to C9 phenylalkyl group that is unsubstituted or substituted by one, two or three C1 to C4 alkyl groups on the phenyl group; or a C1 to C8 acyl group;

each $R_2$ independently represents a C2 to C12 alkylene group; a C4 to C12 alkenylene group; a C2 to C8 alkynylene group; a C5 to C7 cycloalkylene group; a C5 to C7 cycloalkylene di(C1 to C4 alkylene) group; a C1 to C4 alkylene di(C5 to C7 cycloalkylene) group; a phenylene di(C1 to C4 alkylene) group; a 1,4-piperazinediyl; a C4 to C12 alkylene group having a structure including —O— or —N($X_1$)— between a C—C bond, where $X_1$ represents a C1 to C12 acyl group, a (C1 to C12 alkoxy) carbonyl group or any group represented by L below; a group of Formula (a); a group of Formula (b) or a group of Formula (c);

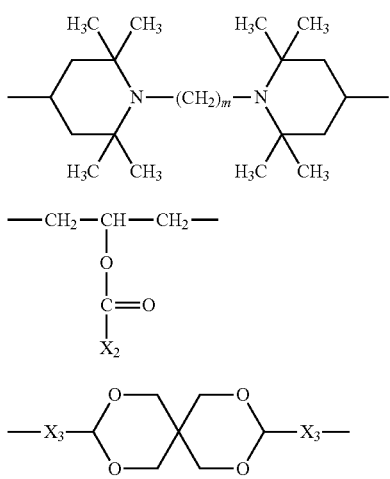  (a)

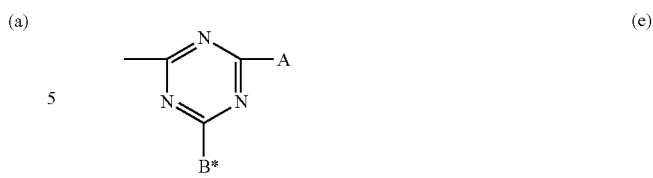 (e)

(b)
—CH₂—CH—CH₂—
       |
       O
       |
       C=O
       |
       X₂

(c)

wherein in Formula (e), B* represents one among the definitions given for A, and B* and A may be the same;

wherein in Formula (e), A represents N(R₄)(R₅), each R₄ and R₅ independently represents a C1 to C18 alkyl group; C5 to C12 cycloalkyl group that is unsubstituted or substituted by one, two or three C1 to C4 alkyl groups; a C3 to C18 alkenyl group; a phenyl group that is unsubstituted or substituted by one, two or three C1 to C4 alkyl groups or C1 to C4 alkoxy groups; C7 to C9 phenyl alkyl group that is unsubstituted or substituted by one, two or three C1 to C4 alkyl groups on the phenyl group; or a C2 to C4 alkyl group substituted by a tetrahydrofurfuryl group, or at position 2, 3 or 4, by —OH, a C1 to C8 alkoxy group, or a di(C1 to C4 alkyl)amino group.

wherein in Formula (a), m represents 2 or 3;

wherein in Formula (b), X₂ represents a C1 to C18 alkyl group; a C5 to C12 cycloalkyl group that is unsubstituted or substituted by one, two or three C1 to C4 alkyl groups; a phenyl group that is unsubstituted or substituted by one, two or three C1 to C4 alkyl groups or C1 to C4 alkoxy groups; or a C7 to C9 phenylalkyl group that is unsubstituted or substituted by one, two or three C1 to C4 alkyl groups on the phenyl group;

wherein in Formula (c), each X₃ independently represents a C2 to C12 alkylene group; and wherein in Formula (I):

wherein L represents a C1 to C18 alkyl group; a C5 to C12 cycloalkyl group that is unsubstituted or substituted by one, two or three C1 to C4 alkyl groups; a C3 to C18 alkenyl group; a phenyl group that is unsubstituted or substituted by one, two or three C1 to C4 alkyl groups or C1 to C4 alkoxy groups; a C7 to C9 phenylalkyl group that is unsubstituted or substituted by one, two or three C1 to C4 alkyl groups on the phenyl group; or a C2 to C4 alkyl group substituted by a tetrahydrofurfuryl group, or at position 2, 3 or 4, by OH, a C1 to C8 alkoxy group, a di(C1 to C4 alkyl)amino group;

R represents a group represented by Formula (d);

2. The acrylic resin film according to claim 1, having a thickness of 10 to 500 μm.

3. The acrylic resin film according to claim 2, obtained by melt extruding the acrylic resin composition, forming the extrusion into a film by a T-die method.

4. A laminate comprising the acrylic resin film according to claim 1 and a thermoplastic resin substrate.

5. The laminate according to claim 4, wherein the thermoplastic resin substrate is a polyvinyl chloride resin, ABS resin, polycarbonate resin or polyolefin resin.

6. The laminate according to claim 4, wherein the thickness of the thermoplastic resin substrate is 50 to 500 μm, and the thickness of the acrylic resin film is 10 to 180 μm.

7. A laminate comprising the acrylic resin film according to claim 3 and a thermoplastic resin substrate.

8. The laminate according to claim 7, wherein the thermoplastic resin substrate is a polyvinyl chloride resin, ABS resin, polycarbonate resin or polyolefin resin.

9. The laminate according to claim 7, wherein the thickness of the thermoplastic resin substrate is 50 to 500 μm, and the thickness of the acrylic resin film is 10 to 180 μm.

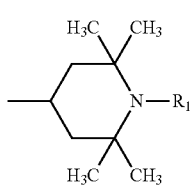 (d)

R₁ in Formula (d) represents a structure identical to R₁ in Formula (I);

wherein in Formula (I):

B represents N(R₇)(R₈), where R₇ and R₈ are each independently selected from a C1 to C18 alkyl group and a group represented by Formula (d); and both terminals in Formula (I) are the following Formula (e):

10. The acrylic resin film according to claim 1, wherein the high-molecular-weight amine-based light stabilizer (A) comprises a structural unit represented by Formula (I) wherein:

R₁ is a hydrogen atom,

R₂ is a C6 alkylene group,

R is represented by Formula (d), wherein R₁ in Formula (d) is a hydrogen atom,

B is —N(R₇)(R₈), where R₇ is a C4 alkyl group, and R₈ is represented by Formula (d), wherein R₁ in Formula (d) is a hydrogen atom; and both terminal groups in Formula (I) are Formula (e), wherein A and B* represent N(R₄)(R₅), each R₄ and R₅ represents a C4 alkyl group.

11. The acrylic resin film according to claim 1, wherein a content of the monomeric component (B-1-a) in the rubber-containing polymer (B-1) is 5 to 80%, and a content of the monomeric component (B-1-b) in the rubber-containing polymer (B-1) is 15 to 90% based on 100% by mass of a total content of the monomeric component (B-1-a), the monomeric component (B-1-b) and a monomeric component (B-1-c).

12. A method of forming a melt extrusion into a film by way of a T-die method, comprising melt extruding the acrylic resin composition for films according to claim 1.

* * * * *